United States Patent [19]
Ehret et al.

[11] 4,122,592
[45] Oct. 31, 1978

[54] TEST PLUG ASSEMBLY AND METHOD FOR PRESSURE TESTING THE INLET CONNECTION FOR LIQUID JET FLOOR OUTLET FITTINGS

[75] Inventors: Gordon F. Ehret, Alhambra; William N. Rowley, Palos Verdes Estates, both of Calif.

[73] Assignee: Wylain, Inc., Dallas, Tex.

[21] Appl. No.: 773,013

[22] Filed: Feb. 28, 1977

[51] Int. Cl.² ............... F16L 55/10; G01M 3/04
[52] U.S. Cl. ........................... 29/404; 138/90; 73/40.5 R; 29/407
[58] Field of Search ............ 29/404, 407; 138/90; 73/40.5 R, 49.1, 49.5, 49.8

[56] References Cited
U.S. PATENT DOCUMENTS

| | | | |
|---|---|---|---|
| 2,749,945 | 6/1956 | Kaiser | 138/90 |
| 2,974,685 | 3/1961 | Ver Nooy | 138/90 |
| 3,326,243 | 6/1967 | Augustus | 138/90 |
| 3,448,773 | 6/1969 | Bindernagel et al. | 138/90 |

*Primary Examiner*—Milton S. Mehr
*Attorney, Agent, or Firm*—Lane, Aitken, Dunner & Ziems

[57] ABSTRACT

A test plug assembly for insertion into a housing for preventing liquid under pressure from flowing therethrough includes an assembly body with an undersurface shaped and dimensioned to mate with a shaped upper portion of the housing. A plurality of flanges which project from the outer surface of the body are located and spaced apart so that the studs can pass between the flanges when the body is inserted into the housing and so that the uppermost surface of the flanges will engage the lowermost surface of the studs when the shaped upper portion and undersurface are in contact and the body is rotated relative to the housing. The body further includes a gripper for gripping the body so it can be rotated into engagement with the housing.

A method of pressure testing a fitting for a liquid inlet includes the steps of installing an inlet fitting on a pipe which is located beneath the underwater surface and which communicates with a source of liquid under pressure, mounting a liquid jet housing on the fitting by forming a leak proof connection between the fitting and housing, inserting a removable plug into the housing which is capable of preventing liquid from passing through the housing at a testing pressure, introducing liquid at a testing pressure into the housing through the inlet fitting, and replacing the removable plug with the housing's normal internal assembly.

8 Claims, 11 Drawing Figures

TEST PLUG ASSEMBLY AND METHOD FOR PRESSURE TESTING THE INLET CONNECTION FOR LIQUID JET FLOOR OUTLET FITTINGS

BACKGROUND OF THE INVENTION

This invention is directed to the installation of liquid jet outlets located in the underwater surface of a swimming pool, and more particularly to an improved test plug assembly and method for installing and pressure testing the floor inlet fitting and liquid jet housing connection before the assembly is embedded in the swimming pool floor.

As described in U.S. Pat. No. 3,506,489, which is owned by the assignee of the instant application, a swimming pool can easily and effectively be cleaned by utilizing liquid jets spaced around the underwater surface. U.S. Pat. No. 3,408,006, also owned by the assignee of the instant application, is directed to a mechanism for producing liquid jets useful in the cleaning method and apparatus taught in the other patent. The mechanism of U.S. Pat. No. 3,408,006 includes a plunger with cam surfaces shaped and dimensioned so that intermittent introduction of pressurized liquid to the plunger housing will cause the plunger to axially reciprocate and rotate. As the plunger rotates, its outlet orifice registers with succeeding outlet ports in the housing so that the jets of liquid will intermittently flow under pressure and sweep an angle of 360°.

The liquid jet housing is located beneath the underwater surface of the pool and embedded in the concrete pool floor. The housings are attached through a T-fitting to piping which is located under the pool floor and which communicates with the source of liquid under pressure and an appropriate valve arrangement which provides the intermittent introduction of pressurized liquid to the housing. When the pool is under construction, the T-shaped inlet fitting normally would be connected to the piping and a standpipe soldered or solvent welded in place on the portion of the T which leads to the jet housing. The pipe is capped and the fitting pressure tested. The standpipe would then be cut to the correct height and the jet housing connected to the standpipe, after which the concrete floor of the pool would be formed and the inlet fitting and housing embedded in the concrete. A plaster finish coat is normally applied on top of the concrete and the outlet of the floor opening is flush with the underwater surface of the pool. The internal structure of the liquid jet assembly would then be inserted in the housing to complete installation.

It has been found that the method just described requires unnecessary steps such as installation and capping the standpipe and cutting it before the housing is installed, which adds to the cost of the swimming pool installation. In addition, by pressure testing the inlet fitting before the jet housing is connected, there is no testing procedure for the connection between the housing and the inlet fitting so that any leakage at the joint would not be detected until the entire assembly is embedded in concrete and the finish surface is formed. It can readily be seen that even if the possibility of joint leakage at that location is remote, the situation is still undesirable because of the great expense necessary to repair the leak.

SUMMARY OF THE INVENTION

In accordance with the invention, the above problems are solved by utilizing a novel test plug assembly and method for installing and pressure testing the floor inlet fitting and jet housing.

Instead of utilizing a standpipe and capping it prior to pressure testing the inlet fitting as described above, the jet housing is installed prior to pressure testing. A special test plug assembly is then inserted into the housing to prevent leakage of liquid therethrough and the entire assembly, including the housing connection as well as the connection for the inlet fitting, is pressure tested. This allows for the housing connection to be pressure tested, which was not possible in the method described above.

The test plug assembly is formed of components used in the jet producing mechanism which have been modified with the addition of a pressure wall to prevent the flow of liquid through the housing. This keeps the cost of producing the test plug assemblies down and provides a check on whether the housing will properly accommodate the jet producing mechanism before the entire assembly is embedded in concrete.

After the housing and inlet fitting are found to be leak proof, the concrete floor is poured and the housing and fitting are embedded in the concrete. The plaster finish is then applied and the jet internal assembly is installed in the housing.

As can be seen, this method provides for significantly fewer steps than the prior art method and at the same time enables the housing connection to be pressure tested along with the inlet fitting, which is not possible in the prior art method. The method and plug of the present invention also provide a procedure for checking whether the housing will properly accommodate the jet producing assembly before the housing is embedded concrete.

BRIEF DESCRIPTION OF THE DRAWINGS

The invention will be better understood when the detailed description of the preferred embodiments is considered in conjunction with the appended drawings, in which.

DETAILED DESCRIPTION OF THE PREFERRED EMBODIMENTS

Before a detailed description of the inventive test plug assembly and method are presented, it would be helpful in understanding the invention to know the internal structure of the jet housing and the jet producing internal mechanism. As noted above, this mechanism is basically described in much greater detail in U.S.

Figure 1:
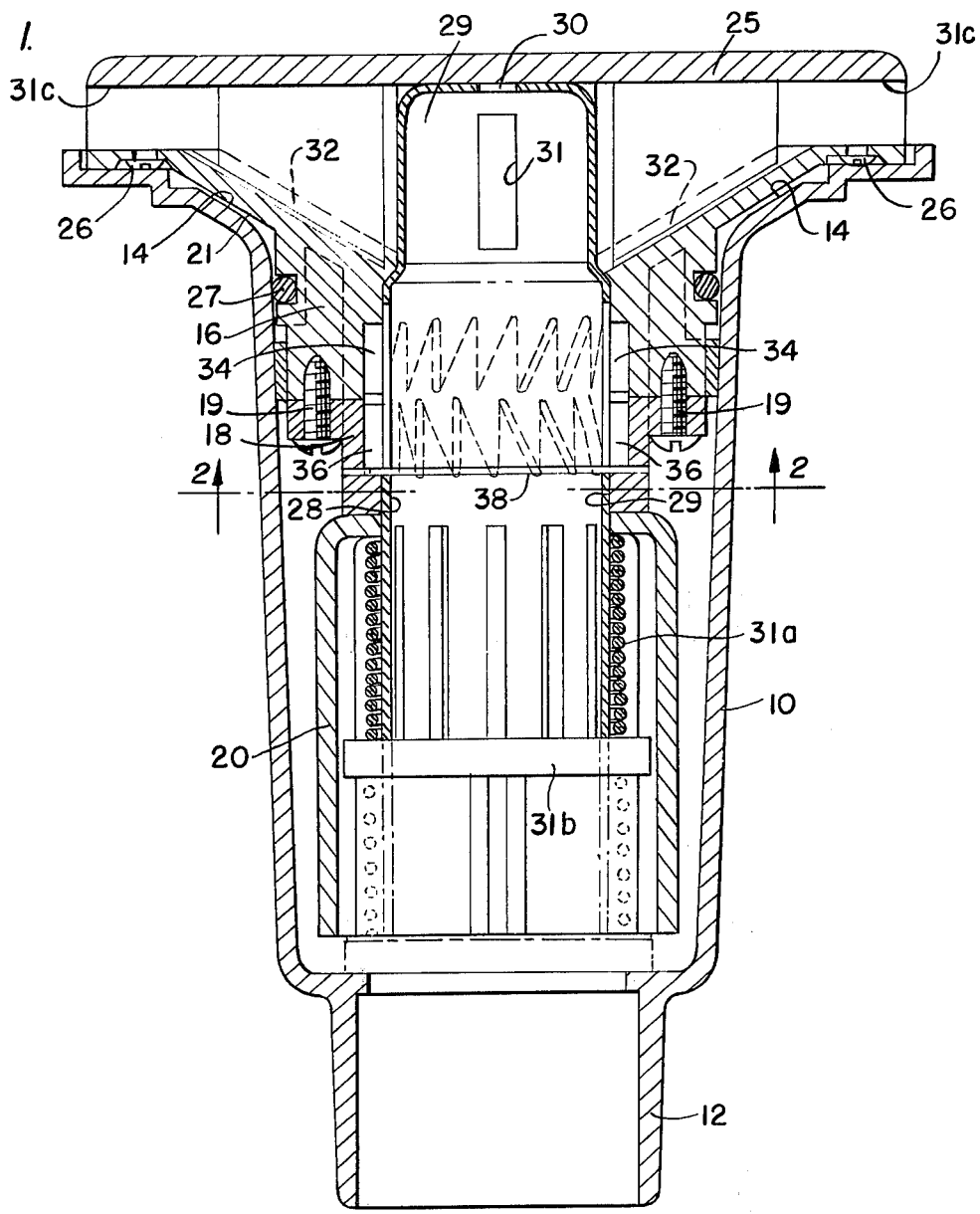
FIG. 1 is a cross-sectional view of the jet housing and internal mechanism for producing the liquid jet.
Figure 2:
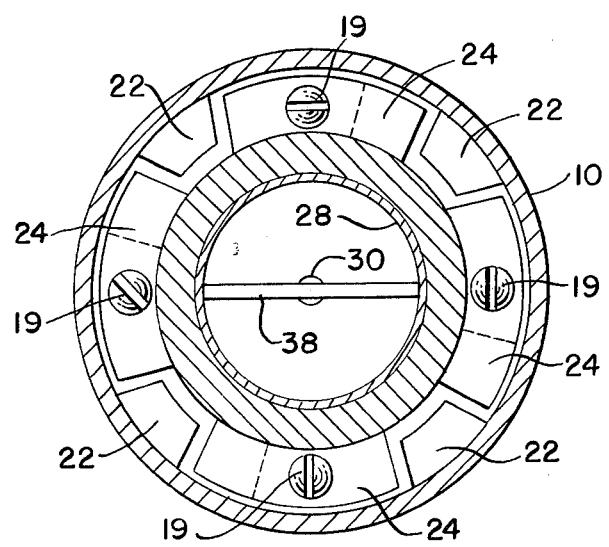
FIG. 2 is a cross-sectional view, taken along the line 2—2 of FIG. 1.

Pat. No. 3,408,006, but several structural changes have been made which are described below. FIGS. 1 and 2 show the housing and internal assembly, the housing being designated generally by reference numeral 10. A sleeve 12 forms the lower portion of the housing and is adapted to fit onto a pipe (not shown) leading from the inlet fitting which will be described in greater detail later. The housing 10 is cylindrical in shape and includes a flared, frustoconical upper opening 14 which forms the top portion of the housing.

An internal mechanism, which is inserted through the opening 14, includes an upper body portion 16, a collar portion 18 connected to the upper body portion 16 by means of a plurality of screws 19, and a cylindrical member 20 which extends immediately below the collar portion 18 as shown in FIG. 1 and is secured thereto by welding, or the like. The upper end of the upper body portion 16 has a flared portion 21 which is shaped to mate with the flared upper opening 14.

A plurality of studs 22, shown in FIG. 2, are spaced apart around the inner surface of the housing 10 and when the internal mechanism is seated in the housing 10 the bottom surfaces of the studs 22 engage the upper surfaces of a like number of flanges 24 which are formed around the collar 18.

Figure 3:
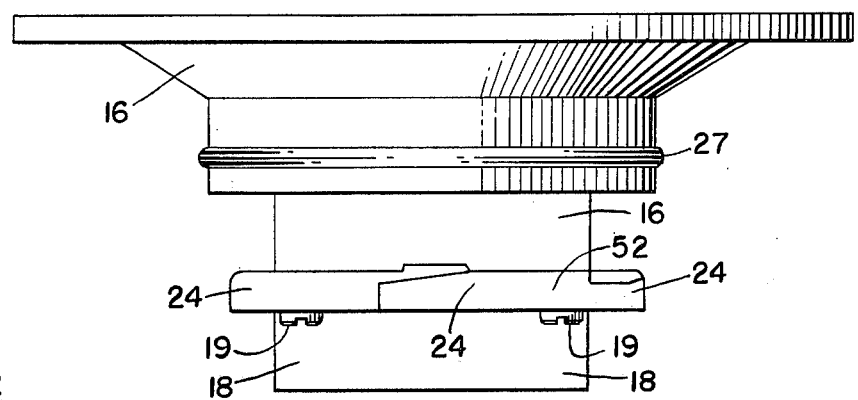
FIG. 3 is a front elevational view, partially in section, of the upper portion of the internal mechanism.

FIG. 2 depicts the relative positions of the studs 22 and flanges 24 when the internal mechanism is inserted into the housing. It can be seen that the studs 22 will pass through the spaces formed between the flanges 24 as the internal mechanism moves into the housing. When the undersurface of the flanged portion 21 of the upper body portion 16 engages the flared opening 14 and the flanges extend below the studs, the mechanism can then be turned relative to the housing 10 so that the upper surfaces of the flanges 24 will engage the lower surfaces of the studs 22 and hold the mechanism in place and resist upper movement when the mechanism is subjected to the upward force caused by liquid under pressure as will be described below. The leading edges of the flanges 24 are tapered, as shown in FIG. 3, for allowing the mechanism to turn and easily reach a point of engagement between the upper surfaces of the flanges and the lower surface of the stud.

Referring again to FIG. 1, a flat top cover 25, with outlet openings described in detail below, is mounted at the top of the internal mechanism and is connected to the upper body portion 16 by means of a plurality of screws 26. An O-ring 27 provides a liquid tight seal between the housing 10 and the upper body portion 16.

A hollow cylindrical plunger 28 is mounted to slide up and down within a cylindrical chamber 29 formed in the upper body portion 16, the collar portion 18 and the cylindrical member 20. The lower end of the plunger 28 is open and the upper end is closed except for a small vent opening 30. An outlet orifice in the form of a vertically extending slot 31 is formed in the upper portion of the plunger 28 and located so that liquid can flow out of the upper portion of the plunger 28 through the slot 31, in a manner described in greater detail below, when the plunger 28 is in its uppermost position as shown in FIG. 1.

A compression spring 31a is positioned around the lower periphery of the plunger 28 in the interior of the cylindrical member 20 and is positioned to abut the upper portion of the member 20 and a flange 31b on the lower portion of the plunger 28 in such a way to normally urge the plunger 28 downward to the position shown by the dashed lines.

A number of radially extending ports 31c are located around the vertical wall of the cover 25, which register with a like number of channels formed between a number of vertically extending radial webs 32 integral with or otherwise secured to the upper surface of the flared portion 21 of the upper body portion 16 and spaced around said surface. The plunger 28 moves up and down, as described below, and rotates by an amount to cause the vertically extending slot 31 to register with the next adjacent port 31c through its cooperating channel after each up and down cycle. The rotational movement of the plunger 28 is caused by cam surfaces 34, 36, formed in the upper body portion 16 and collar portion 18, respectively, and a cooperating pin 38 as shown in FIG. 1. The cam surfaces 34, 36, have alternate vertical and oblique surfaces which operate to accommodate the extremeties of the pin 38 which, as shown in FIG. 1, is fixed to extend diametrically through opposite walls of the plunger 28.

When liquid under pressure is introduced into the plunger 28, it impinges against the top and overcomes the force exerted by the spring 31a. The plunger 28 will then move upwardly towards its upper position shown by the solid lines in FIG. 1, in which the liquid escapes from the vertically extending slot 31 and through the port 31c which is then registering with the slot 31. During the upward movement of the plunger 28, it will not rotate as the pin 38 moves along one of the vertical surfaces of the cam 34, but will rotate when the pin 38 engages and moves along an oblique surface of the cam 36. When the liquid pressure is released, the force exerted by the spring 31a will no longer be overcome and the plunger 28 will be forced downward by the spring 31a and the opposite effect takes place, e.g. no rotation until the pin 38 engages an oblique surface in the cam 34. Intermittent introduction and withdrawal of pressurized fluid will thus cause the plunger 28 to intermittently rotate through 360° and provide a full 360° sweep of the pool's underwater surface and supply the cleansing action for which the assembly is designed.

Figure 4:
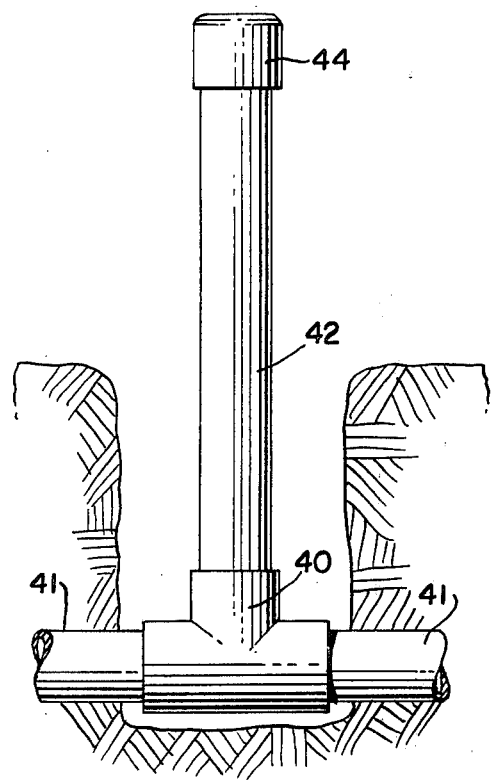
FIGS. 4–9 illustrate the steps of the prior art method for pressure testing the inlet fitting and subsequent installation in the housing of the internal jet producing mechanism.

In order to install the liquid jet assembly in the underneath surface of a swimming pool, the following method is normally followed. First, as illustrated in FIG. 4, a T-shaped inlet fitting 40 is connected by any suitable means such as, for example, soldering for metal pipe or solvent welding for plastic pipe, to pipes 41 which are connected to a source of fluid under pressure and a valve arrangement (not shown) suitable for providing the intermittent flow described above. The pipes and fitting can be formed of any suitable material, bearing in mind that systems of this type normally operate under a pressure of about 60 p.s.i. and are designed for 100 p.s.i.

As further illustrated in FIG. 4, a standpipe 42 is inserted into the upper opening of the inlet fitting 40 and either soldered or solvent welded in place. A cap 44 is placed on the standpipe 42 to provide a leak proof seal. The inlet fitting 40 is then pressure tested by introducing liquid under pressure through the pipes 41. If the joint does not leak, the standpipe 42 is cut to a predetermined height, as illustrated in FIG. 5.

Figure 6:
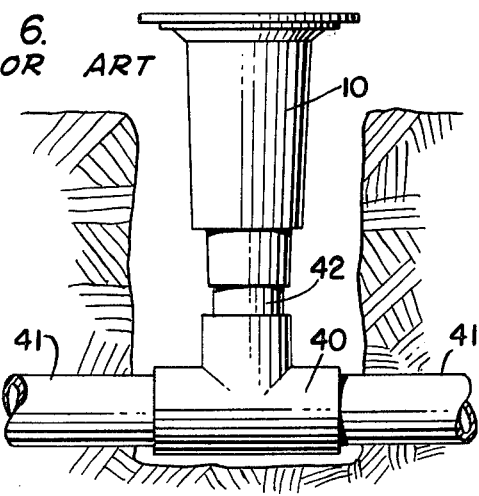
Figure 7:
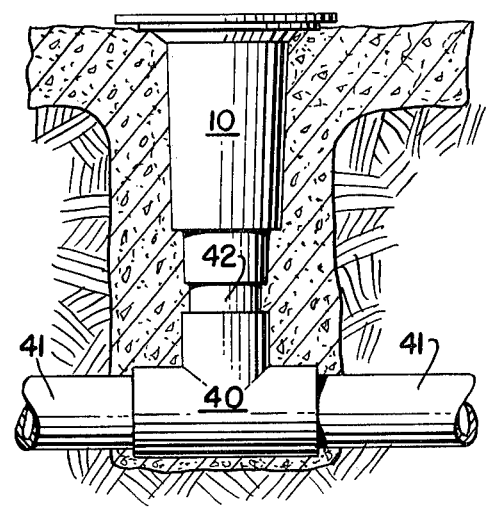
Figure 8:
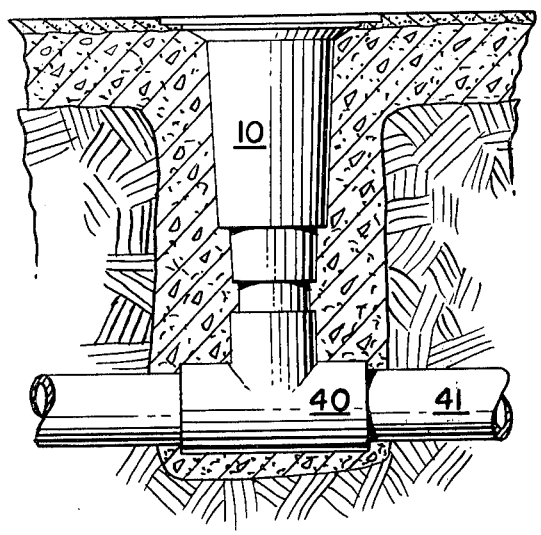
Figure 9:
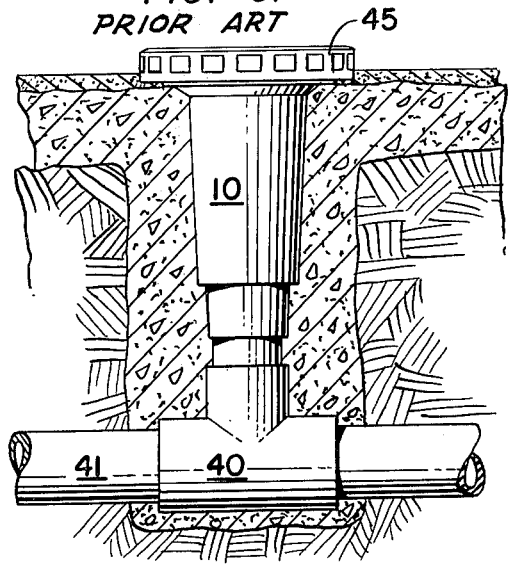

As illustrated in FIG. 6, a jet housing 10 is mounted on the cut off portion of the standpipe 42 and soldered or welded in place. The floor of the pool is then formed by pouring a layer of concrete in which the housing and inlet fitting are embedded, as shown in FIG. 7. A plaster finish surface is then applied to the concrete, as shown in FIG. 8, and an internal assembly 45 mounted in the housing 10, as shown in FIG. 9, to complete the liquid jet assembly.

Figure 5:
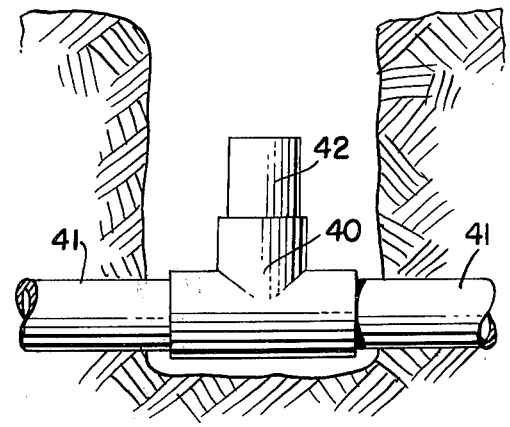
Figure 10:
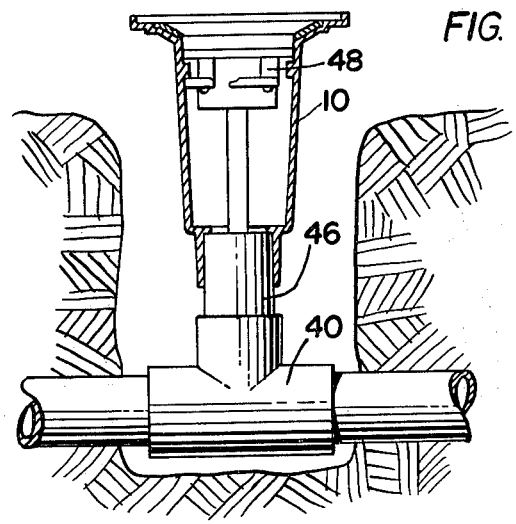
FIG. 10 illustrates the step of the method of the present invention which replaces the first three steps of the method illustrated in FIGS. 4–9.

Referring to FIG. 10, which illustrates the step in the method of the present invention which replaces the old steps shown in FIGS. 4–6, instead of utilizing the standpipe 42 for pressure testing the inlet fitting 40, the novel method provides for mounting the housing 10 on a pipe section 46 and securing the latter in the vertical opening of the inlet fitting 40. A novel test plug assembly 48, which is described in detail below, is inserted in the housing 10, either before or after the latter is mounted on the pipe section 46. Pressure testing is then conducted and the test plug assembly operates as a seal to prevent liquid from flowing through the housing 10. If there are no leaks, the assembly is completed by performing the steps of FIGS. 7–9.

In this way the joint between the pipe section 46 and the housing 10, which could not be pressure tested in the prior art method, is able to be tested along with the other joints of the system. In addition, the method of the present invention eliminates the need to cut the standpipe 42 (as shown in FIG. 5) and form the joint between the remaining section and the housing 10 at an awkward position as shown in FIGS. 5 and 6. Instead, that joint can be formed before the pipe section 46 is joined to the inlet fitting 40, which is much easier to do and provides a greater probability that a joint will be formed which does not leak.

Figure 11:
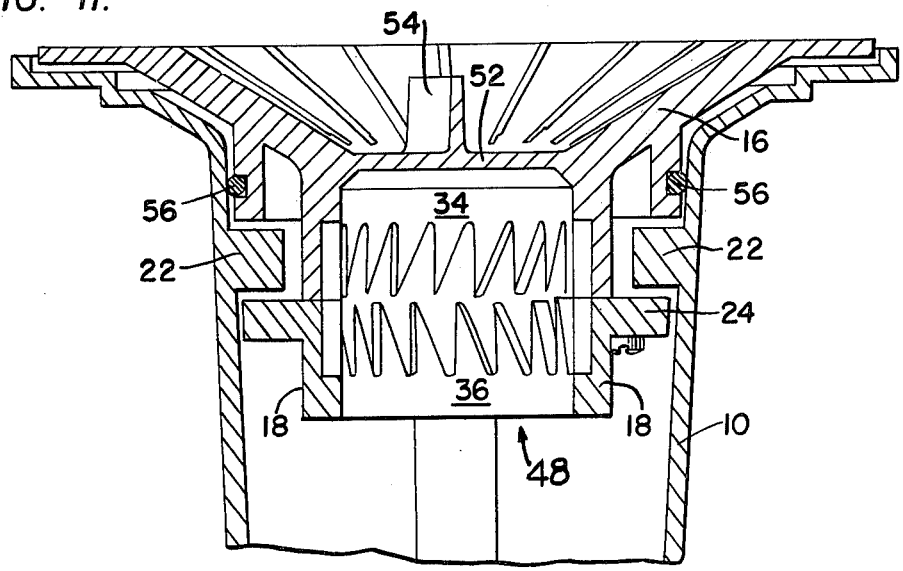
FIG. 11 is a sectional view of the test plug assembly inserted in the housing.

In order to carry out the method described above, a novel test plug 10 is utilized, which is shown in detail in FIG. 11. The same structural components used to form the upper body portion 16 and the collar portion 18 of the internal mechanism described above are used to form the test plug assembly, the only difference being that a pressure wall 52 is formed across the upper opening of the upper body portion 16 so that no fluid can escape from the assembly during testing. It will also be noticed that the test plug assembly is inserted into the housing and held in place the same way described above for the internal jet producing mechanism by means of the studs 22 and the flanges 24, a gripper or handle 54 being formed on the outer surface of the pressure wall 52 so that the plug assembly can easily be turned and locked in place. An O-ring 56, similar to the one used in the jet producing mechanism, is provided to seal the opening between the plug assembly and the housing 10. A significant advantage of using a test plug assembly of this design is that the same parts used to form the internal mechanism of the jet can be used to form the plug, which keeps manufacturing costs at a minimum.

Of course after the testing procedure has been completed, the test plug assembly is removed and the internal mechanism is inserted as discussed above.

Thus, there is provided in accordance with the invention, a novel test plug assembly and method for pressure testing liquid jet assemblies to insure that the connection leading to the housing is leak proof as well as the fitting which connects the housing to the pipe leading from the source of pressurized fluid. This eliminates the problem of having to remove the entire assembly after it has been embedded in concrete to fix any leaks which might occur. In addition, costs are kept to a minimum by forming the test plug assembly from the same elements which are used to form the internal housing mechanisms of the liquid jet.

It will be apparent to one with ordinary skill in the art that many modifications and variations can be made to the present invention within the spirit and scope of the invention, all such variations and modifications being contemplated as falling within the scope of the appended claims.

We claim:

1. An improved test plug assembly of the type adapted to form a pressure resistant test seal in a liquid jet producing device, the liquid jet producing device comprising a housing with a shaped upper portion, a plurality of studs spaced around and projecting from the inner surface of the housing, an internal liquid jet producing mechanism adapted to be inserted in the housing, the upper portion of the mechanism including an undersurface shaped and dimensioned to mate with said shaped upper portion, a plurality of flanges projecting from the outer surface of the mechanism located and spaced apart so that the studs can pass between the flanges when the mechanism is inserted into the housing and so that the uppermost surface of the flanges will engage the lowermost surface of the studs when the said shaped upper portion and said undersurface portion are in contact and the mechanism is rotated relative to the housing for holding the mechanism in place, the improved test plug assembly comprising a body adapted to be inserted into the housing and prevent liquid under pressure from flowing therethrough, the body including an undersurface shaped and dimensioned to mate with said shaped upper portion, a plurality of flanges projecting from the outer surface of the body located and spaced apart so that the studs can pass between the flanges when the body is inserted into the housing and so that the uppermost surface of the flanges will engage the lowermost surface of the studs when said shaped upper portion and said undersurface are in contact and the body is rotated relative to the housing, and gripping means for gripping the body so it can be rotated into engagement with the housing.

2. The improvement in claim 1, wherein an O-ring is positioned between the body and the housing.

3. The improvement in claim 1, wherein the housing is cylindrical in shape and the shaped upper portion is frustoconical in shape.

4. The improvement in claim 1, wherein the body is identical in shape to a portion of the liquid jet producing mechanism except that the body further includes a pressure resistant wall for preventing liquid from flowing therethrough.

5. A test plug assembly for insertion into a housing of a liquid jet producing device to form a pressure resistant seal, said assembly comprising a body member shaped and dimensioned to fit within said housing and including an undersurface shaped and dimensioned to mate with a complementary upper surface of said housing, a plurality of flanges projecting from the outer surface of said body member and located and spaced so that a plurality of studs extending from the inner surface of said housing can pass between the flanges when the body member is inserted into the housing, the upper surfaces of said flanges adopted to engage corresponding lower surfaces of said studs when said undersurface of said body member engages said upper surface of said housing and when said body member is rotated relative to said housing, and a pressure resistant wall extending across said body member for preventing liquid from flowing through said housing.

6. The assembly of claim 5 further comprising gripping means formed on said body member for facilitating rotation of said body member into engagement with said housing.

7. A method of pressure testing a fitting for a swimming pool liquid inlet, comprising the steps of:
  (1) installing an inlet fitting on a pipe which is located beneath the underwater surface and which communicates with a source of liquid under pressure,
  (2) mounting a liquid jet housing on the fitting in a manner to form a leak proof connection between the fitting and housing,
  (3) sealing the inlet fitting and housing in the material which forms the underwater surface so that the outer surface of the housing is flush with the underwater surface,
  (4) inserting a removable plug into the housing, the plug being capable of preventing liquid from passing through the housing at a testing pressure,
  (5) introducing liquid at a testing pressure into the housing through the inlet fitting, and
  (6) replacing the removable plug with internal assembly means adapted to introduce liquid into the pool.

8. A method of pressure testing a fitting for a swimming pool liquid inlet, comprising the steps of:
  (1) installing an inlet fitting on a pipe which is located beneath the underwater surface and which communicates with a source of liquid under pressure,
  (2) mounting a liquid jet housing on the fitting in a manner to form a leak proof connection between the fitting and housing,
  (3) introducing a removable plug axially into the housing and rotating said plug to engage cooperating cam surfaces provided on the plug and housing to lock the plug against axial outward movement, the plug being capable of preventing liquid from passing through the housing at a testing pressure,
  (4) introducing liquid at a testing pressure into the housing through the inlet fitting,
  (5) replacing the removable plug with internal assembly means, and
  (6) introducing the internal assembly means axially into the housing and rotating the internal assembly means to engage cam surfaces provided on said internal assembly means with said cam surfaces of said housing to lock said internal assembly means against axial outward movement, said internal assembly means being adapted to introduce liquid into said pool.

* * * * *